United States Patent

[11] 3,525,287

| [72] | Inventor | Desmond H. J. Reynolds<br>Sutton Coldfield, England |
|---|---|---|
| [21] | Appl. No. | 703,070 |
| [22] | Filed | Feb. 5, 1968 |
| [45] | Patented | Aug. 25, 1970 |
| [73] | Assignee | Girling Limited<br>Birmingham, England<br>a British company |
| [32] | Priority | Feb. 10, 1967 |
| [33] | | Great Britain |
| [31] | | 6,455/67 |

[54] DIFFERENTIAL PRESSURE MOTOR SYSTEMS
5 Claims, 7 Drawing Figs.

[52] U.S. Cl. .................................................... 91/33,
91/448, 91/468
[51] Int. Cl. ..................................................... F15b
13/042

[50] Field of Search ................................ 91/33, (Inquired);
60/54.5P (Cursory); 41/448 (Cursory)

[56]  References Cited
UNITED STATES PATENTS
| 2,982,260 | 5/1961 | Hunter ........................ | 91/33 |
| 3,094,843 | 6/1963 | Martin ........................ | 60/54.5P |

*Primary Examiner*— Paul E. Maslousky
*Attorney*—Scrivener, Parker, Scrivener and Clarke

ABSTRACT: The invention concerns a vehicle brake operating servo motor system in which, in addition to the two fluid pressure levels conventionally employed to provide brake actuating pressure differentials a third pressure level is used and is made available for brake actuating service by a differential pressure operable valve arrangement which operates responsive to inadequacy in or failure of one of the first-mentioned two pressure levels.

Figure 1:
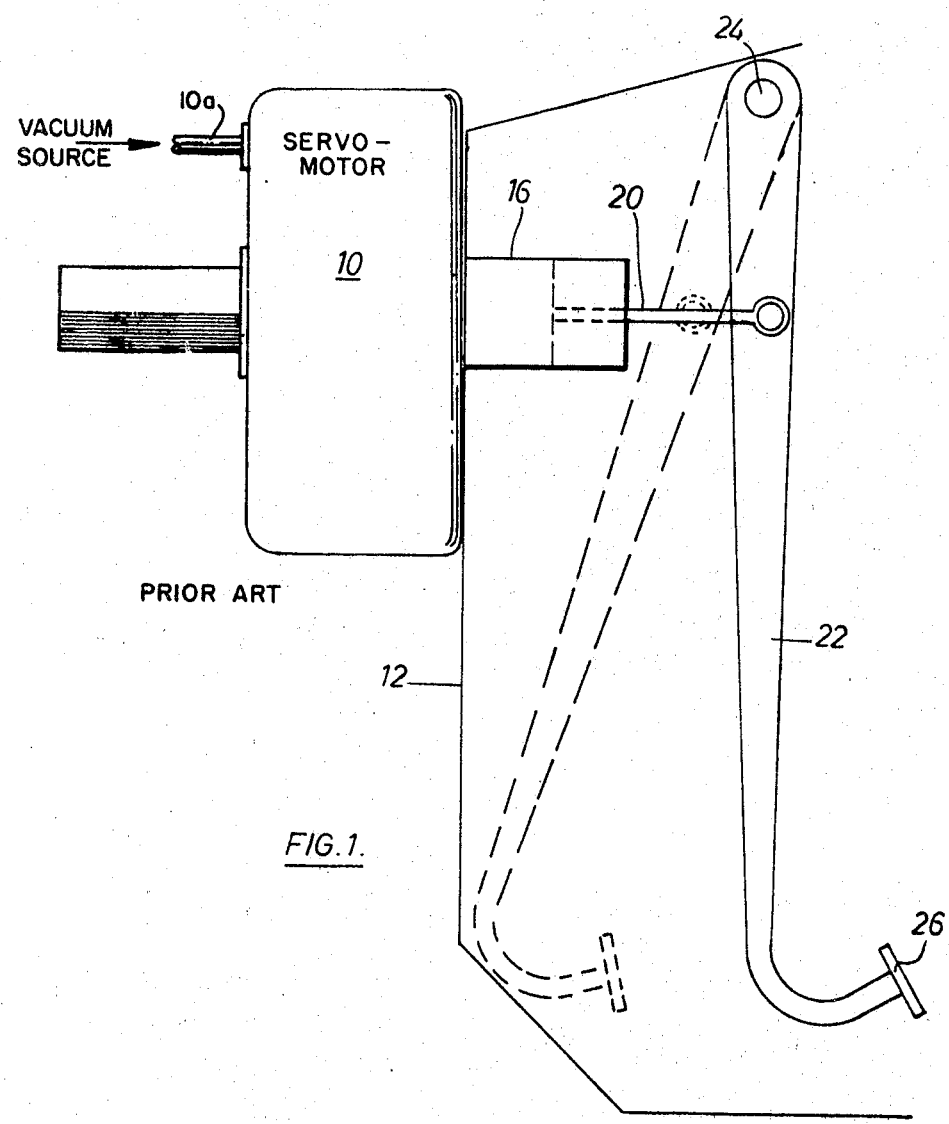

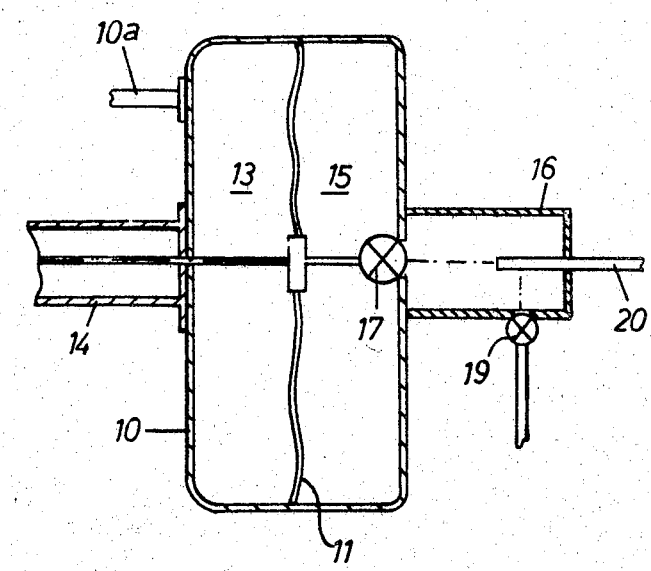
FIG.1.A

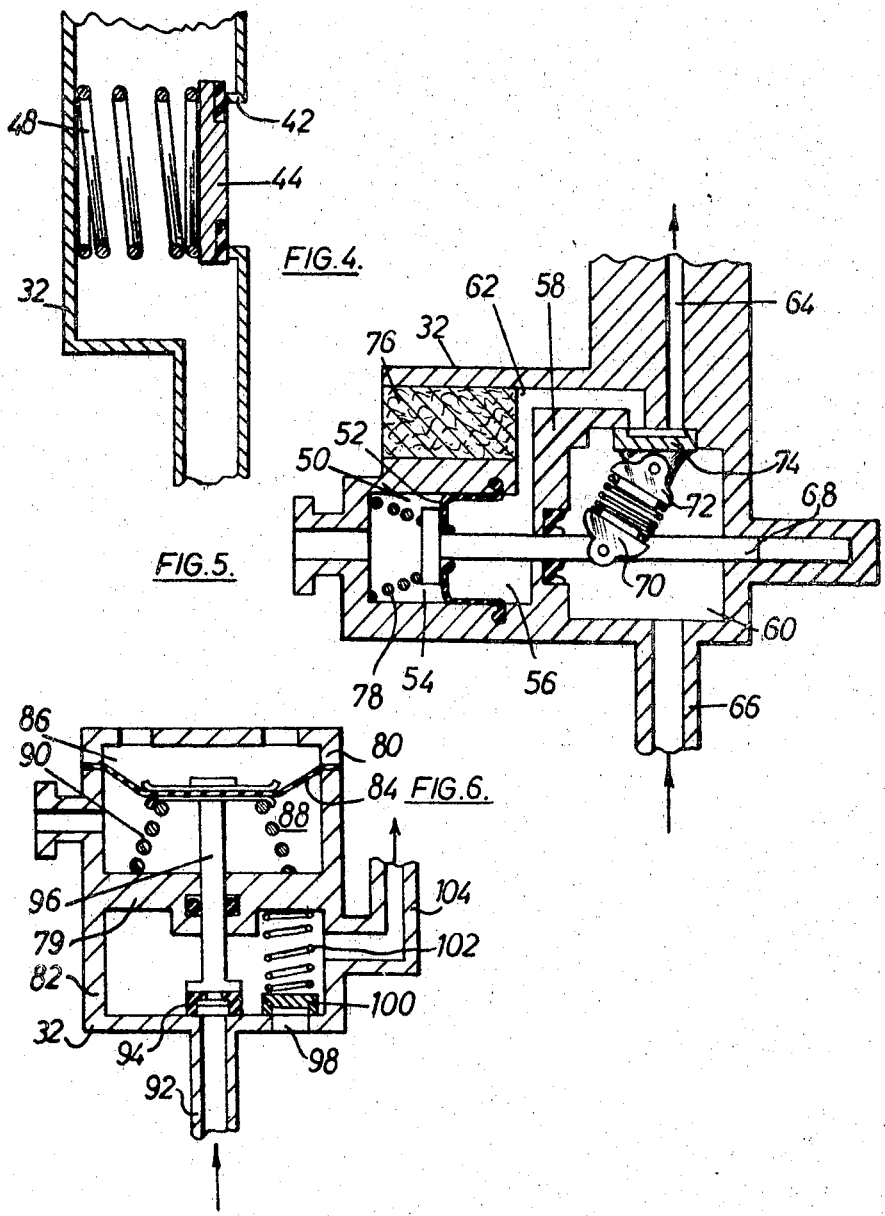

DIFFERENTIAL PRESSURE MOTOR SYSTEMS

This invention concerns differential pressure motor systems such as those which include so-called servo motors often used for achieving power-assisted operation of the clutch and of the brake arrangements in road vehicles.

Servo motor systems employed in road vehicles usually include a housing internally divided into a pair of contiguous, independent compartments by a movable wall connected to a motor output member accessible externally of the housing for cooperation with a clutch or a brake operating member, the arrangement being such that, while one of the compartments is permanently connected to a first source of fluid pressure, commonly the vacuum prevailing at the engine inlet manifold, the other compartment is selectively connectable by control valve means both to the same fluid pressure source or to a second source, generally atmosphere, for the purpose of establishing a differential pressure between the two compartments to displace the movable wall and thus the motor output member. In a servo motor system of this nature, operation of the control valve means is usually accomplished by foot pressure exerted by the vehicle driver upon a foot pedal and provision is made for direct actuation of the clutch or the brake operating member responsive to foot pressure in the event of failure of the fluid differential pressure for any reason. Under such circumstances, in the absence of the power assistance normally afforded by the servo motor, the pedal travel and pedal effort required of the driver to effect proper operation of the clutch or of the brake can be quite substantial. The invention seeks to provide a differential pressure motor system in which this disadvantage may be mitigated.

According to the present invention, a differential pressure motor system comprises a differential pressure motor including a housing internally divided into two compartments by a movable wall, first and second fluid pressure sources of different pressure, control valve means operable to isolate the two compartments and to connect one of them to one of said first and second pressure sources while the other compartment is connected to the other pressure source, a third fluid pressure source of pressure different from said first and second sources, and differential pressure-operable valve means operable to connect said third source in place of one of said first and second sources when, on operation of the control valve means, there is an insufficient increase in pressure difference between the two compartments.

In a typical practical application of the invention, where the system is employed in the power-assisted operation of the clutch or the brake arrangement of an automobile, the first-mentioned fluid pressure source is the reduced pressure available at the engine intake manifold, while the second and third sources are at higher pressures, for example, atmospheric air and compressed air, as required. The availability of the compressed air supply to act on the movable wall of the motor makes it possible for the requisite working effort to be obtained from the motor output member with a much smaller size of movable wall than would be the case if only atmospheric air were available, as in conventional motors and thus enables the physical size of the motor to be reduced as compared with conventional motors. Generally, although not exclusively, it is preferred in the operation of the present invention to employ the compressed air to complement the atmospheric air, and the differential pressure operated valve means is arranged to this end. Such differential pressure operated valve means may, for example, comprise a differential pressure operated diaphragm arranged either to move a closure member between open and closed positions in a fluid flow passage for supplying compressed air to the motor control valve means or to displace a valve member between positions respectively arranged to admit atmospheric air or compressed air to the motor control valve means. Alternatively, however, the differential pressure operated valve means may simply comprise a plate valve or similar closure member resiliently biased towards a port in a compressed air flow passage to the motor control valve means, the port communicating with atmospheric air and the plate valve being moved in an opening direction responsive to the differential pressure between atmospheric air and the reduced pressure created in said passage should the compressed air supply fail.

Figure 2:
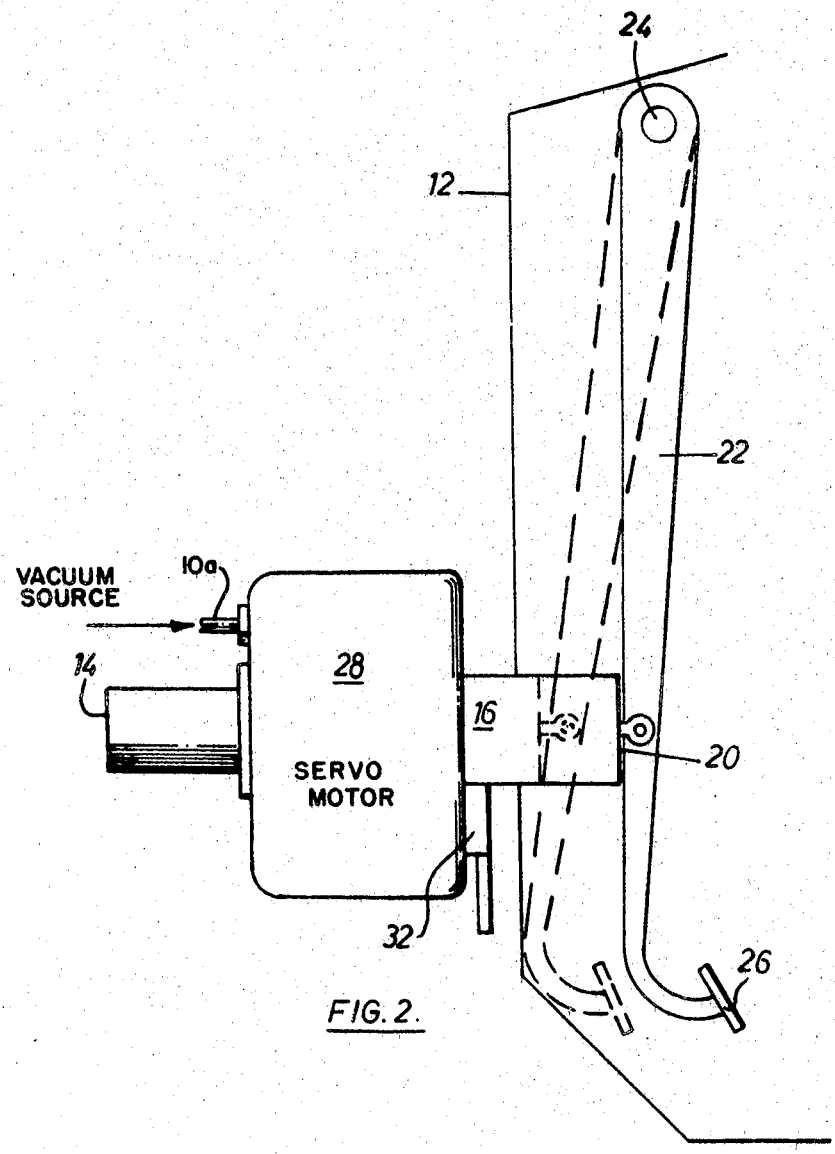
Figure 3:
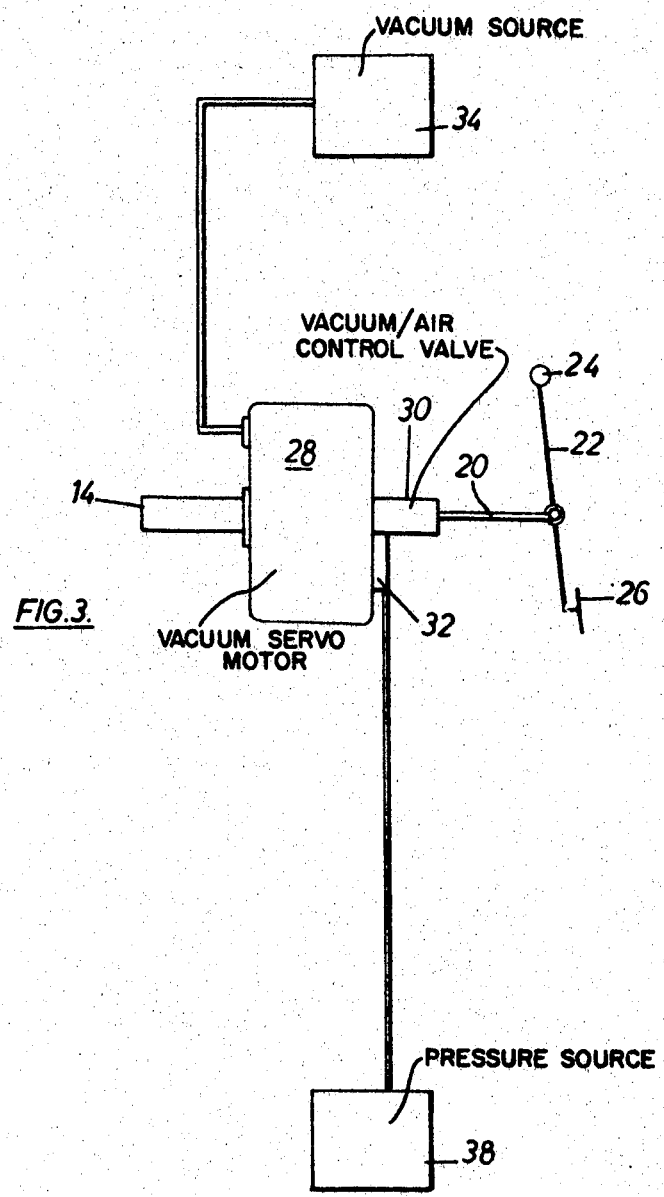

The invention will be described further, by way of example, with reference to the accompanying drawings, in which:

FIG. 1 is a diagrammatic representation of a part of a conventional vehicle brake actuating arrangement including a servo motor and brake operating pedal mounted on a vehicle bulkhead, FIG. 1a is a diagrammatic illustration of control valve means conventionally provided in a brake servo motor, FIG. 2 is a representation similar to FIG. 1 of a brake actuating arrangement embodying the invention, FIG. 3 is a schematic operational diagram of a brake actuating system embodying the arrangement of FIG. 2, and FIGS. 4 to 6 inclusive are diagrammatic sectional details of differential pressure operated valves for use in the system illustrated in FIG. 3.

As shown in FIGS. 1 and 1a a conventional brake actuating system includes a servo motor 10 secured to a vehicle bulkhead 12 and carrying a hydraulic master cylinder 14. For the purposes of the present invention, the servo motors herein referred to may be assumed to be of any convenient conventional construction including a movable wall 11 internally dividing the motor housing into a pair of independent compartments 13 and motor 15 and control valve means including a vacuum valve set 17 and an air valve set 19 for enabling the compartment 15 to be selectively connected to two different sources of pressure fluid, the other compartment 13 being permanently connected to one of said sources, shown in FIGS. 1 and 1a as being a vacuum source 10a. In FIG. 1, the motor control valve means is illustrated as arranged in an auxiliary housing 16 mounted on an end wall of the servo motor housing 10, opposite the master cylinder 14. The motor control valves 17 and 19 are selectively operable responsive to displacement of a connecting rod 20 pivotally connected to a pedal lever 22 hinged at its top end by a pivot 24 to the bulkhead and terminating at its lower end in a pedal 26. As is conventional, with the valves 17 and 19 in their normal, unoperated conditions, the compartments 13 and 15 communicate with one another, so that, with the compartment 13 connected to the vacuum source 10a, both the compartments 13 and 15 are under vacuum. The housing 10 is usually cylindrical and the diameter of its internal movable wall is determined by the differential pressure known to be available to displace it in a brake actuating direction, in which it in turn displaces the usual piston within the hydraulic master cylinder. The arrangement is such that, should the differential pressure fail for any reason, there is a direct mechanical connection between the pedal 26 and the master cylinder piston which enables the brakes to be actuated by manual pressure alone and in the then assumed absence of the servo assistance provided by the motor 10, it is usual to effect partial compensation for the loss of that assistance by increased manual (that is to say, foot) effort or by increased pedal travel, or by a combination of both. Thus it will be appreciated that any attempt to reduce the pedal effort and/or travel required under normal running conditions by enlarging the booster size or capacity results in either too severe a reduction in braking capacity or too great an increase in the required pedal travel should the servo motor fail.

Referring now to FIGS. 2 and 3, a servo motor system embodying the present invention differs from that described immediately above in that a differential pressure operated valve generally designated 32 is connected to the upstream side of the motor control valve housing 16 of the servomotor 28 and is arranged to direct either atmospheric air or pressurised air to the motor control valves in dependance upon the differential pressure experienced by the pressure operated valve 32. The additional source of power represented by the pressurised air then permits a reduction in pedal lever ratio and consequently of pedal travel (and thus in the eventual length of the vehicle) and also in the pedal effort required for normal brake actuation whilst at the same time permitting a reduction in the size of servo motor required. The availability of the additional source of power also represents a further safety factor in the braking system as a whole, since even if one of the three pressure sources should fail, two such sources remain to enable a pressure differential to be established for accomplishing servo motor operation. Thus, even if, upon failure of one of these sources, the driver does not increase the pedal effort usually applied, the reduction in braking duty is not so significant as with conventional systems and the vehicle can still be stopped in an acceptable distance. As will be appreciated, the possibility of reducing the servo motor size exists because in present conventional systems, the motor must be of a size sufficient to cope with the occasional high deceleration stop requirement under normal running conditions whereas in the system proposed by the invention, the necessary reserve of power is available from the additional pressure fluid source.

Because of the greater power of the motor 28 the pedal lever ratio can be reduced by lowering the pivot at which the servo input rod 20 is connected to the pedal lever. In FIGS. 1 and 2 the fully extended position of the rod 20 is represented at 18, the travel of the rod 20 being the same in both cases.

The reduction in pedal lever ratio enables the pedal lever pivot 24 to be positioned closer to the bulkhead 12 and reduces the pedal travel, both factors also enabling a shorter vehicle to be made.

FIG. 3 illustrates the motor 28 of FIG. 2 incorporated in a typical braking system. As shown, the motor 28 carries an auxiliary housing 30 for motor control valve means analogous to the valves 17 and 19 within the housing 16 of FIGS. 1 and 2, except that the differential pressure operated valve 32 communicates with the housing 30. The usual vacuum source 34 is connected to one of the compartments, corresponding to the compartment 13, defined within the motor 28 by the movable wall therein. A compressed air source 38 is connected to the upstream side of the differential pressure operated valve 32.

FIGS. 4 to 6 inclusive illustrate differential pressure operated valves suitable for use in the invention.

In FIG. 4, the valve housing 32 constitutes part of the compressed air flow passage leading to the motor control valve housing 16 and is formed with a port 42 leading to atmosphere and serving as a valve seat for a plate valve closure member 44 which is resiliently biased towards the seat by a spring 48 acting between the valve member 44 and the housing 32. Under normal running conditions, and in the unoperated condition of the motor control valve, the two compartments of the servo motor 28 are connected to vacuum and compressed air admitted to the housing 32 is applied, as previously mentioned to the upstream side of the motor control valve, that is to say to the position on that control valve which in a conventional arrangement would receive atmospheric air. The spring 48 assists in holding the closure member 44 against the seat 42 and operation of the motor 28 results from the pressure differential created on opposite sides of the servo motor diaphragm by the vacuum source 34 and the compressed air source 38 when the motor control valve is actuated by depression of the brake pedal in the usual way. If, however, the compressed air source should fail, then when the motor control valve is operated, the closure member 44 is unseated by the differential pressure consequently set up across it between the vacuum and atmospheric air and atmospheric air is then admitted to the motor 28 which operates despite the compressed air source failure.

The differential pressure valve shown in FIG. 5 employs a housing 32 which is internally formed with a chamber 50 divided by a flexible diaphragm 52 into a pair of adjoining compartments 54 and 56. The chamber 50 is separated by an internal wall 58 of the housing 32 from an adjacent valve chamber 60, the compartment 56 of the chamber 50 being connected to the valve chamber 60 by a passage 62, and the compartment 54 is connected to the servo motor on the side of the movable wall thereof which is acted upon by constant vacuum. A further passage 64 in the housing 32 opens into the valve chamber 60 in close-spaced relation to the passage 62 and is connected to the motor control valve 16 and compressed air is supplied to the valve chamber 60 through a conduit 66 opposed to the passage 64. The diaphragm 52 carries a rod 68 which extends from the compartment 56 through the wall 58 and the valve chamber 60 and within that valve chamber carries a toggle valve comprising a pair of resiliently separated members 70 and 72, the toggle member 72 carrying a frontally recessed valve closure element 74 adapted to span the openings of both the passages 62 and 64 into the valve chamber 60.

In the operation of the differential pressure valve shown in FIG. 5, with vacuum applied from the brake servo motor to the compartment 54 and compressed air to the conduit 66, the parts are as illustrated in the drawing, that is to say, with the diaphragm 52 and its rod 68 retracted to the left-hand end of the housing 32 and the frontal recess of the valve element 74 spanning the passages 62 and 64. As will be noted, the passage 62 communicates by way of a filter 76 with atmospheric air so that atmospheric air is available through the passage 64 for conventional operation of the servo motor 28. Should the vacuum supply fail, however, or should the degree of vacuum fall towards atmospheric pressure (as may occur with movement of the movable wall within the motor 28), then the vacuum within the compartment 54 will fall, a compression spring 78 interposed between the housing 32 and the end of the diaphragm rod in the compartment 54 will displace the rod to the right as illustrated in the drawing and the toggle valves 70, 72 and 74 will snap over to isolate the passage 62 and to open the passage 64 to the compressed air available in the valve chamber 60. Differential pressure for operation of the motor 28 is thus available but less compressed air is used, it being required only in the case of high duty applications or upon vacuum decrease.

FIG. 6 illustrates another differential pressure operated valve adapted to economise in the use of compressed air. In this embodiment, the housing 32 is again internally divided, in this instance by a transverse wall 79 defining a diaphragm chamber 80 and a valve chamber 82. A diaphragm 84 in turn divides the chamber 80 into a pair of compartments of which the compartment 86 remote from the valve chamber 82 is vented to atmosphere while the compartment 88 is connected to the rear servo motor compartment and contains a spring 90 acting to bias the diaphragm in a direction away from the wall 79. The valve chamber 82 is provided with a conduit 92 connected to a supply of compressed air and the opening of the conduit 92 into the chamber 82 constitutes a valve seat for a closure member 94 situated on the end of a diaphragm rod 96 carried axially by the diaphragm 84 and extending through the dividing wall 79 into the chamber 82. A port 98 in the wall of the chamber 82 communicates with atmospheric air and is normally closed by a plate or the like valve member 100 resiliently urged towards the port by a spring 102. The valve chamber is connected by way of a conduit 104 to the upstream side of the control valve in the auxiliary housing 30.

In the normal operation of the differential pressure valve of FIG. 6, with vacuum applied to the compartment 88 of chamber 80, the diaphragm 84 is held in the position shown in opposition to the spring 90 to maintain the closure member 94 firmly on its seat. The closure member 100 is lifted by differential pressure to admit atmospheric air to the conduit 104 on operation of the servo motor control valve means in conventional manner. If the vacuum drops towards atmospheric pressure, however, or if it fails completely, then the spring 90 lifts the diaphragm and diaphragm rod to allow compressed air to enter the chamber 82 through the conduit 92 and to pass to the servo motor through the conduit 104.

As will be appreciated from the description of the invention given more particularly with reference to FIGS. 4 to 6, each of the ancillary, differential pressure operated valves shown in those figures may be incorporated wherever convenient in a differential pressure operated motor system, for example in the line feeding positive pressure (i.e. atmospheric air or compressed air) to the normal control valve of the motor. Equally, however, the ancillary valve may be embodied in or secured to the motor itself, as diagrammatically indicated in FIGS. 2 and 3 and motors incorporating such valves are to be understood as lying within the scope of the invention.

I claim:

1. In a differential pressure motor system comprising a differential pressure motor including a housing and a movable wall internally dividing said housing into a constant pressure compartment and a variable pressure compartment, a source of vacuum, the constant pressure compartment being connected at all times to said source of vacuum, and manually operated control valve means comprising a first normally open valve set interconnecting the two compartments and a second normally closed valve set connecting said variable pressure compartment with a supply of high pressure fluid which is drawn selectively in sequence from one of two separate high pressure fluid sources at different pressure levels and differential pressure operable valve means for controlling said high pressure sources.

2. A differential pressure motor system as set forth in claim 1 further comprising a fluid flow passage for supplying high pressure fluid to the manually operated motor control valve means and wherein said differential pressure operable valve means comprises a differential pressure operated diaphragm arranged either to move a closure member between open and closed positions in said fluid flow passage or to displace a valve member between positions respectively arranged to admit fluid from the two sources of higher fluid pressure to said motor control valve means.

3. A differential pressure motor system as set forth in claim 1 wherein the differential pressure operable valve comprises a housing formed with a pair of adjacent internal chambers of which one chamber is a valve chamber including a pair of adjacent fluid flow openings respectively connected to the other chamber and to the servo motor control valve means, a valve member co-operating with said openings for connecting them in fluid flow relation or for isolating them from one another and connecting said valve chamber with said manually operated control valve means, a flexible diaphragm dividing the other chamber into a pair of compartments with one compartment connected to the variable pressure compartment of the motor and the other compartment connected to the valve chamber through one of the valve controlled openings therein and a valve-operating rod extending axially from said diaphragm into said valve chamber for controlling the position of said valve member responsive to the differential pressure across said diaphragm.

4. A differential pressure operated motor system as set forth in claim 1 wherein the differential pressure operable valve means comprises a housing formed with a pair of adjacent internal chambers, a diaphragm in one of said chambers and dividing said chamber into a first compartment communicating with atmospheric air and a second compartment communicating with the variable pressure compartment of the motor, a diaphragm rod extending axially from said diaphragm into the other chamber, a valve closure member at the free end of said diaphragm rod and co-operating with an opening of said other chamber communicating with a source of pressurized air, said other chamber being formed with a port venting it to atmospheric air, a spring biased closure member normally closing said vent and a fluid flow connection between said other chamber and the motor control valve means.

5. A differential pressure operated motor system as set forth in claim 1 and further including a pressurized air flow passage, wherein the differential pressure operable valve comprises a plate valve, said air flow passage being formed with a port communicating with atmospheric air, resilient means biasing said plate valve towards said port, said plate valve being movable in an opening direction responsive to the pressure differential between atmospheric air and the reduced pressure created in said passage upon failure of the pressurized air supply.